(12) United States Patent
Sonoda

(10) Patent No.: US 9,117,103 B2
(45) Date of Patent: Aug. 25, 2015

(54) IMAGE INFORMATION PROCESSING APPARATUS AND METHOD FOR CONTROLLING THE SAME

(75) Inventor: Tetsuri Sonoda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 235 days.

(21) Appl. No.: 13/820,560

(22) PCT Filed: Aug. 31, 2011

(86) PCT No.: PCT/JP2011/070312
§ 371 (c)(1),
(2), (4) Date: Mar. 4, 2013

(87) PCT Pub. No.: WO2012/033109
PCT Pub. Date: Mar. 15, 2012

(65) Prior Publication Data
US 2013/0156268 A1 Jun. 20, 2013

(30) Foreign Application Priority Data
Sep. 8, 2010 (JP) .................................. 2010-201341

(51) Int. Cl.
*G06K 9/00* (2006.01)
*G06F 11/10* (2006.01)
*G06T 7/00* (2006.01)
(52) U.S. Cl.
CPC ............ *G06K 9/00201* (2013.01); *G06F 11/10* (2013.01); *G06T 7/0057* (2013.01)
(58) Field of Classification Search
None
See application file for complete search history.

(56) References Cited

U.S. PATENT DOCUMENTS

| 7,388,678 B2 | 6/2008 | Forster et al. | |
| 8,090,194 B2* | 1/2012 | Golrdon et al. | ............... 382/154 |
| 8,172,407 B2* | 5/2012 | Lim | ................................ 353/69 |

(Continued)

FOREIGN PATENT DOCUMENTS

| CN | 1668890 A | 9/2005 |
| CN | 101794461 A | 8/2010 |

OTHER PUBLICATIONS

Salvi et al., "Pattern codification strategies in structured light systems", Pattern Recognition 37 (2004) 827-849, 2004.*

(Continued)

*Primary Examiner* — Anand Bhatnagar
*Assistant Examiner* — Soo Park
(74) *Attorney, Agent, or Firm* — Fitzpatrick, Cella, Harper & Scinto

(57) ABSTRACT

An image information processing apparatus performs three-dimensional measurement of an object using a captured image obtained by projecting onto the object a projection pattern containing a two-dimensional symbol sequence that is obtained by assigning a predetermined symbol to each code in a projection code string in which a plurality of types of codes are arranged two-dimensionally and capturing an image of the object. The apparatus obtains an imaging pattern by extracting a symbol sequence from the captured image, and converts symbol dots in the imaging pattern into corresponding codes, thereby obtaining an imaging code string. The apparatus obtains a predetermined number of codes according to one sampling feature selected from a plurality of types of sampling features, generates an information code string by arranging the obtained codes, and determining the correspondence between the information code string and a part of the projection code string, thereby performing three-dimensional measurement.

14 Claims, 17 Drawing Sheets

(56) References Cited

U.S. PATENT DOCUMENTS

| | | |
|---|---|---|
| 2008/0118143 A1 | 5/2008 | Gordon et al. |
| 2009/0161966 A1 | 6/2009 | Lim |
| 2013/0076896 A1 | 3/2013 | Takabayashi et al. |

OTHER PUBLICATIONS

Adan et al. "Moving surface extraction based on unordered hexagonal perfect submaps projection: applications to 3D feature tracking", Image and Vision Computing 27 (2009), 1083-1096, 2009.*

Pages et al. "An approach to visual servoing based on coded light", ICRA 2006.*

P.M. Griffin et al., "Generation of Uniquely Encoded Light Patterns for Range Data Acquisition", Pattern Recognition, vol. 25, No. 6, pp. 609-616 (Jun. 1992).

J. Salvi, et al., "Pattern Codification Strategies in Structured Light Systems", Pattern Recognition, vol. 37, No. 4, pp. 827-849, (Apr. 2004).

International Search Report for International Application No. PCT/JP2011/070312 dated Dec. 27, 2011.

Written Opinion of the International Searching Authority for International Application No. PCT/JP2011/070312 dated Dec. 27, 2011.

Claes, Kasper, et al. "Robot positioning using structured light patterns suitable for self calibration and 3D tracking," Proceedings of the 2007 International Conference on Advanced Robotics, Jeju, Korea, 2007.

Maurice, Xavier, et al. "Real-time structured light patterns coding with subperfect submaps," Real-Time Image and Video Processing 2010, Proc. of SPIE, vol. 7724, 2010, S. 77240E-1-8.

German Official Action dated Dec. 20, 2013, issued in counterpart German patent application No. 11 2011 102 991.8.

Dec. 29, 2014 Office Action in foreign counterpart application Chinese Patent Application No. 201180043428.9.

Morita Hiroyoshi, et al., "Measurement of Three Dimensional Shape by Means of Projected Encoded Patterns Capable of Correcting Dot-Errors", Transactions of Information Processing Society of Japan, Information Processing Society of Japan, Mar. 1988, pp. 233-241, vol. 29, No. 3.

* cited by examiner

- RED
- GREEN
- BLUE

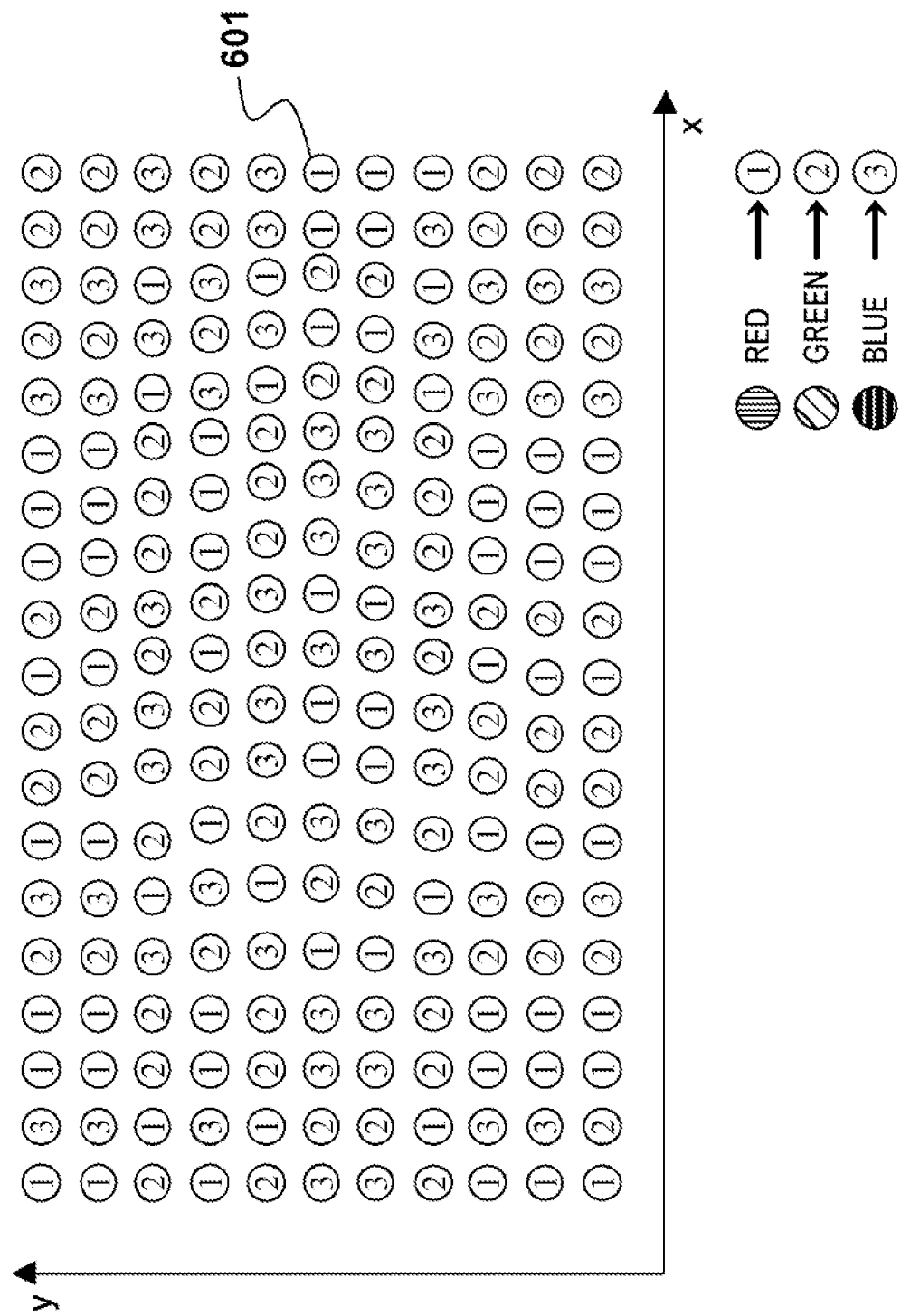

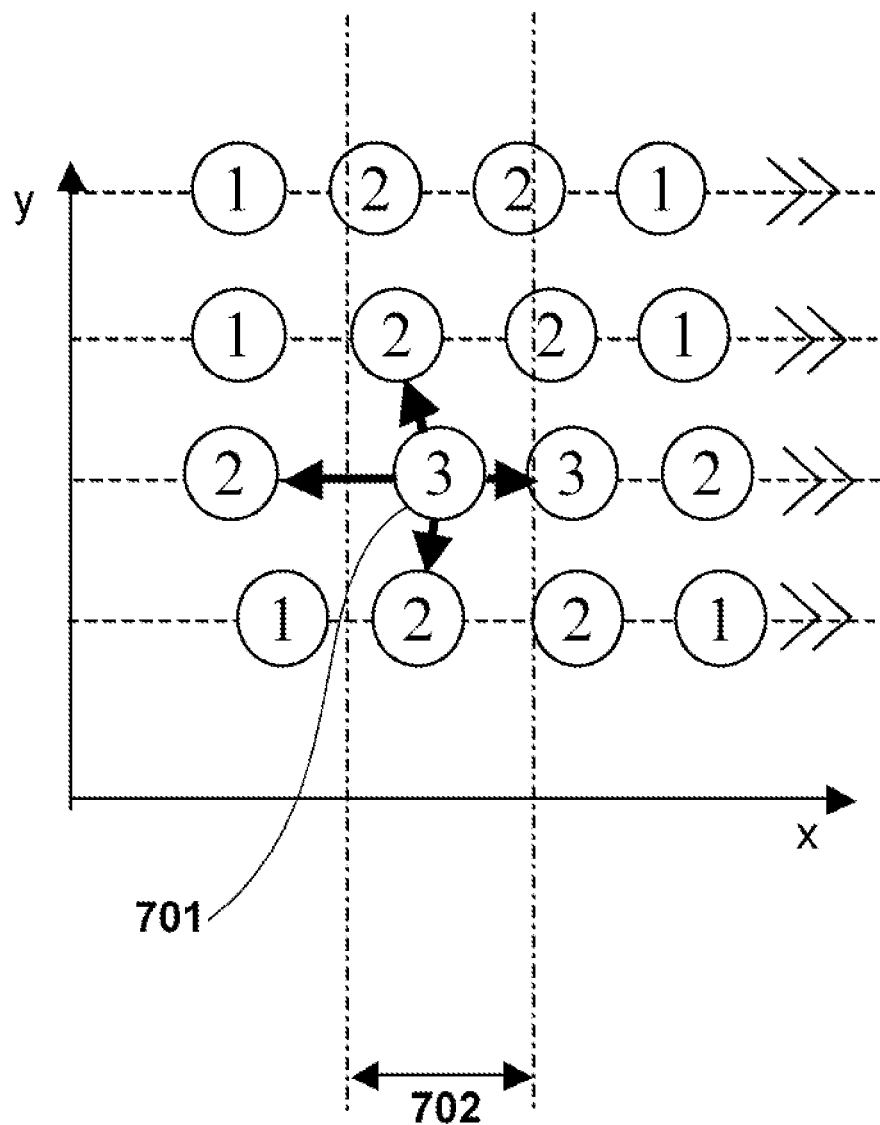

F I G. 11
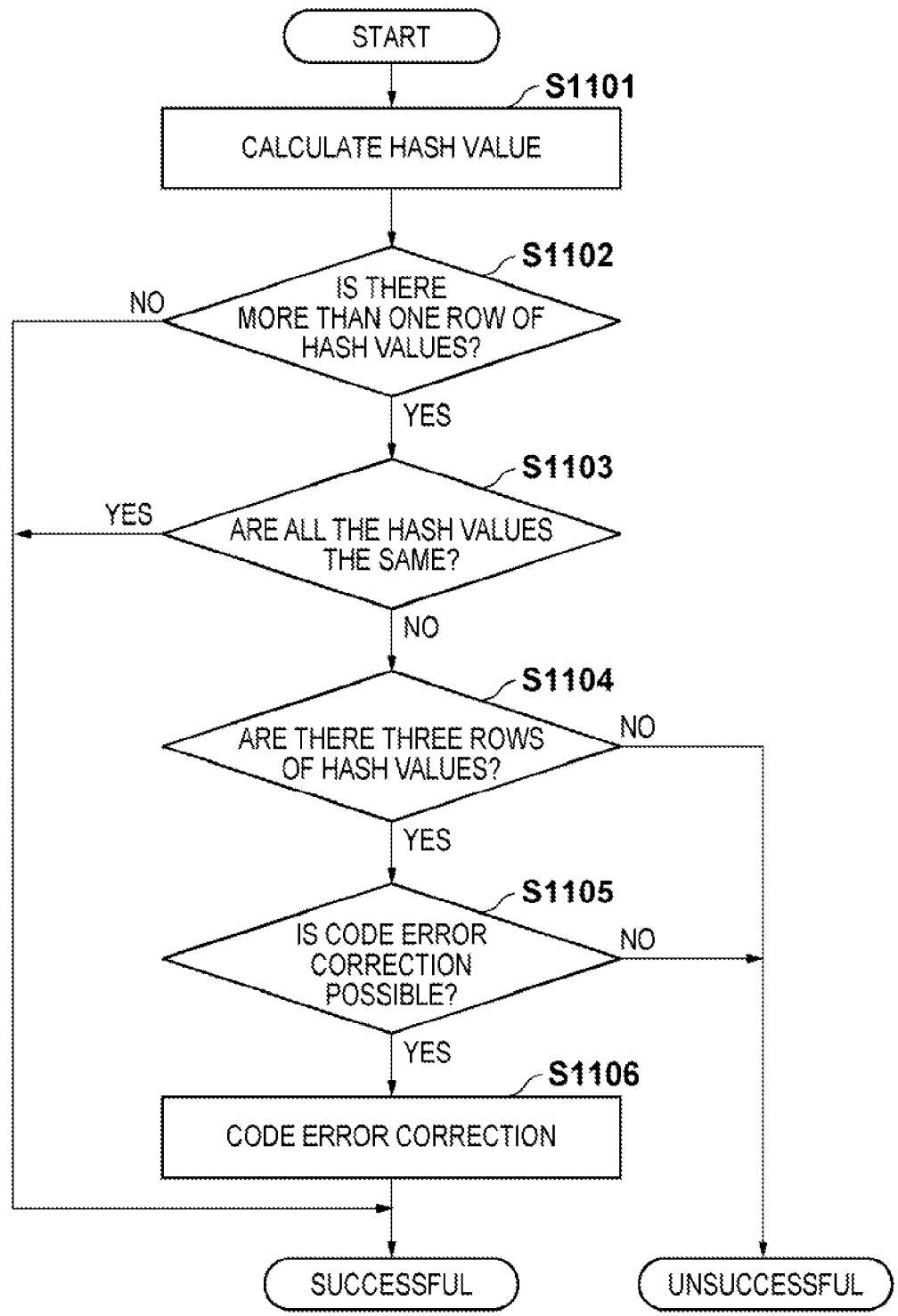

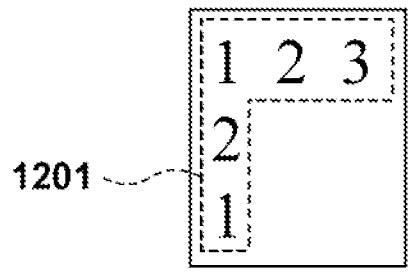
F I G. 12A
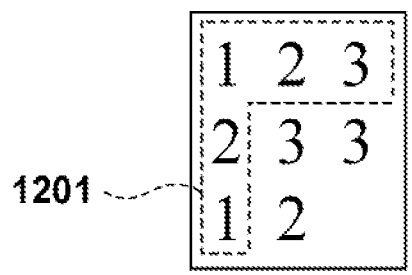
F I G. 12B
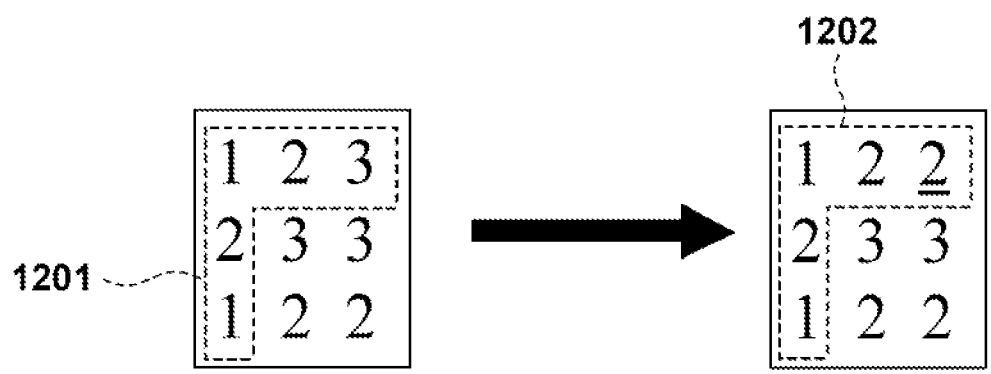
F I G. 12C     F I G. 12D

F I G. 13A

1 1

F I G. 13B

1 1
1 0
1

F I G. 13C

1301 — 1 1
1 0
1 0

F I G. 15
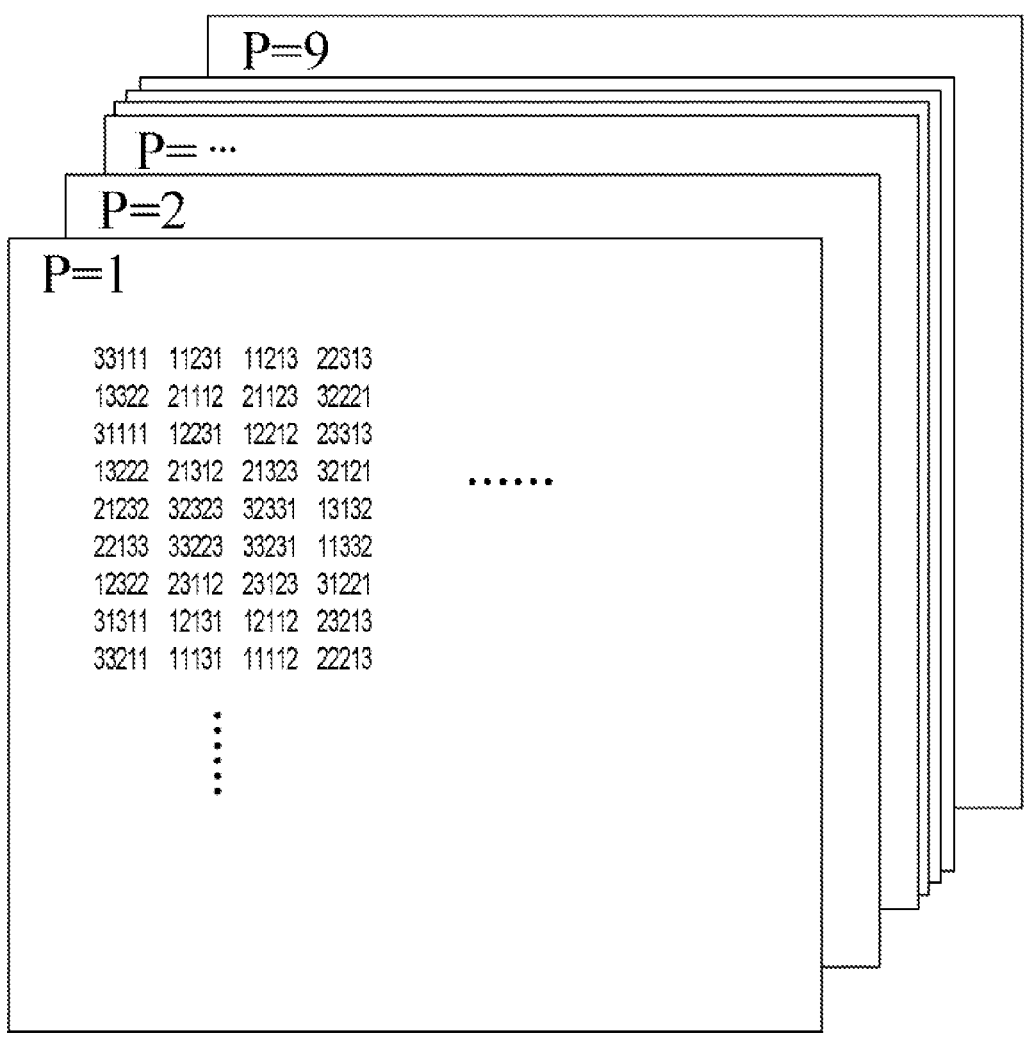

F I G. 17
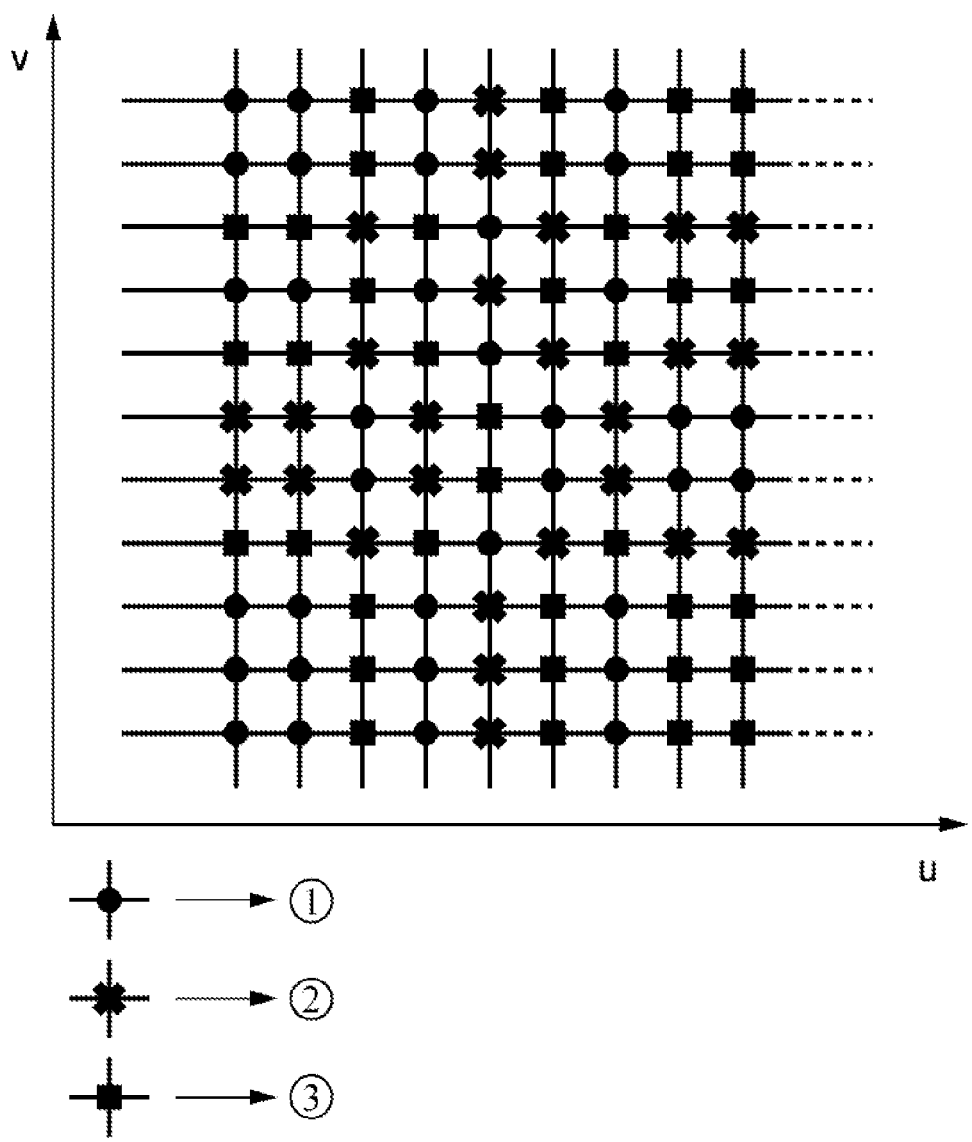

IMAGE INFORMATION PROCESSING APPARATUS AND METHOD FOR CONTROLLING THE SAME

TECHNICAL FIELD

The present invention relates to an image information processing apparatus that performs three-dimensional measurement by detecting a predetermined pattern from an image captured by projecting the predetermined pattern and a method for controlling the image information processing apparatus.

BACKGROUND ART

Apparatuses that measure the three-dimensional shape of objects are widely used in various fields, for example, for inspecting parts in factories in the industrial field or measuring the shape of living organisms in the medical field. In particular, noncontact measurement methods are effective in cases where there is a risk that a target object may be deformed or broken by contact with a measurement apparatus. In such noncontact three-dimensional shape measurement, a scheme is widely used, in which a triangulation method is performed using an image obtained by an image capturing apparatus. For example, P. M. Griffin, L. S. Narashimhan, and S. R. Yee: "GENERATION OF UNIQUELY ENCODED LIGHT PATTERNS FOR RANGE DATA ACQUISITION", Pattern Recognition, Vol. 25, pp. 609-616 (hereinafter, Literature 1) describes an example in which three-dimensional shape measurement is performed by projecting a dot sequence pattern that is characterized by its color onto an object with a projector and imaging the reflected light with a camera.

The procedure of three-dimensional measurement stated in Literature 1 will be specifically described below. First, a three-color RGB dot sequence in which the color sequence is determined by a two-dimensional code string in conformity with a mathematical rule is projected as a projection pattern image onto an object with a projector. An image of the object onto which the projection pattern image is projected is captured with a camera, and a dot sequence observed in the captured image is picked out as an imaging dot sequence. The sequence of adjacent colors in the picked-out imaging dot sequence is decoded as an imaging code string based on a predetermined code string. Using the mathematical rule of the code string of the projection pattern image, the correspondence between partial code strings of portions contained in the obtained imaging code string and two-dimensional positions on the code string of the projection pattern image is determined. All the possible partial code strings in the imaging code string are picked out, the correspondence between the partial code strings and two-dimensional positions is determined as described above, and three-dimensional positions of individual dots are obtained based on the principle of triangulation. Three-dimensional shape measurement of an object is performed using the above-described procedure.

However, in the above-described conventional example, there is the problem that, depending on the shape of the object, it may not be possible to determine the correspondence with respect to a region of a captured image in which a partial code string of a sufficient size cannot be picked out from the imaging code string, so that three-dimensional shape measurement cannot be performed. Moreover, there is the problem that in a case where a sequence of dots that originally are not adjacent to each other is erroneously picked out from an imaging dot sequence or in the case where a color in the imaging dot sequence is distinguished as a wrong color due to noise or other reasons, the code string will be associated with a wrong two-dimensional position, and inaccurate results of three-dimensional measurement will be output. It is indeed possible to detect such erroneous correspondence by increasing the length of a partial code string used in correspondence determination, but, on the other hand, a problem arises that depending on the shape of the object, the region in which a partial code string cannot be picked out from the imaging code string may increase even more.

SUMMARY OF INVENTION

The present invention has been made in view of the above-described problems, and according to an embodiment of the invention, a more robust three-dimensional measurement method that reduces erroneous determination of correspondence, and yet enables even three-dimensional measurement of more diverse shapes of objects is provided.

According to one aspect of the present invention, there is provided an image information processing apparatus that performs three-dimensional measurement of an object using a captured image obtained by projecting onto the object a projection pattern obtained by assigning, to each code in a projection code string in which a plurality of types of codes are two-dimensionally arranged, a symbol that differs from one type of code to another, the apparatus comprising: obtaining means for obtaining an imaging pattern by extracting symbols from the captured image; converting means for converting each symbol in the imaging pattern obtained by the obtaining means into a corresponding code to obtain an imaging code string; generating means for generating an information code string by obtaining a predetermined number of codes from the imaging code string according to a sampling feature in which sampling positions of the predetermined number of codes and a sequence of the codes are defined and arranging the obtained codes; and measuring means for performing three-dimensional measurement of the object by determining correspondence between the information code string and the projection code string based on the information code string and the sampling feature.

Also, according to another aspect of the present invention, there is provided a method for controlling an image information processing apparatus that performs three-dimensional measurement of an object using a captured image obtained by projecting onto the object a projection pattern obtained by assigning, to each code in a projection code string in which a plurality of types of codes are two-dimensionally arranged, a predetermined symbol that differs from one type of code to another, the method comprising: obtaining an imaging pattern by extracting symbols from the captured image; converting each symbol in the imaging pattern obtained in the obtaining step into a corresponding code to obtain an imaging code string; generating an information code string by obtaining a predetermined number of codes from the imaging code string according to a sampling feature in which sampling positions of the predetermined number of codes and a sequence of the codes are defined and arranging the obtained codes; and performing three-dimensional measurement of the object by determining correspondence between the information code string and the projection code string based on the information code string and the sampling feature.

Further features of the present invention will become apparent from the following description of exemplary embodiments with reference to the attached drawings.

BRIEF DESCRIPTION OF DRAWINGS

FIG. 6 is a diagram showing an example of an imaging code string.

FIG. 7 is an enlarged diagram of a part of the imaging code string.

FIG. 11 is a flowchart illustrating a method of code error detection/correction.

FIGS. 12A to 12D are diagrams showing three examples of a sampled code string for performing code error detection/correction.

FIGS. 13A to 13C are diagrams showing hash values calculated from the three examples of the sampled code string.

FIG. 15 is a diagram showing an example of projection code string tables that are used in the present embodiment.

FIG. 17 is a diagram showing an example of another projection pattern.

DESCRIPTION OF EMBODIMENTS

Hereinafter, an example of a preferred embodiment of the present invention will be described with reference to the attached drawings.

Figure 1:
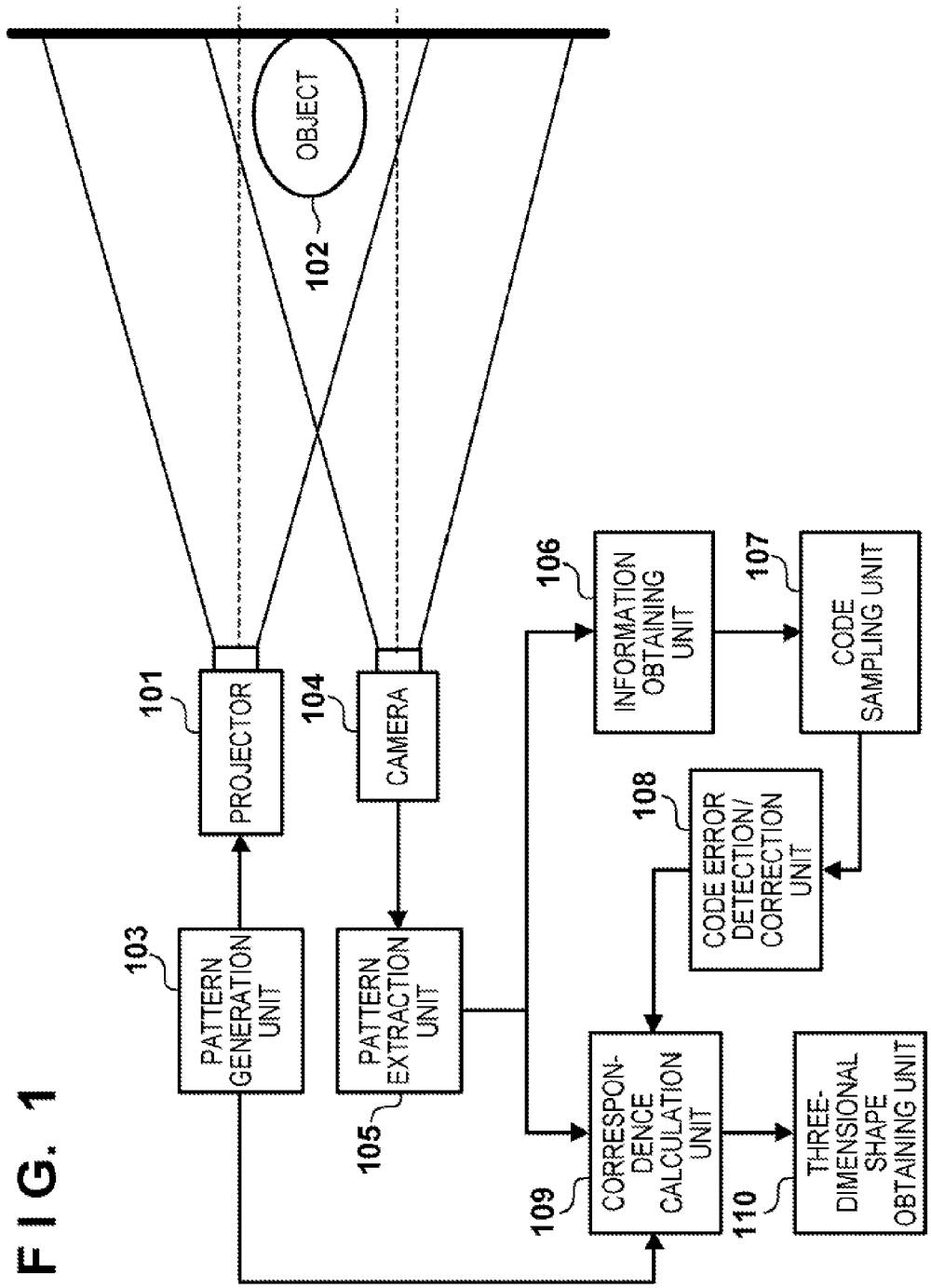
FIG. 1 is a diagram showing an overall configuration of a three-dimensional measurement apparatus.
Figure 2:
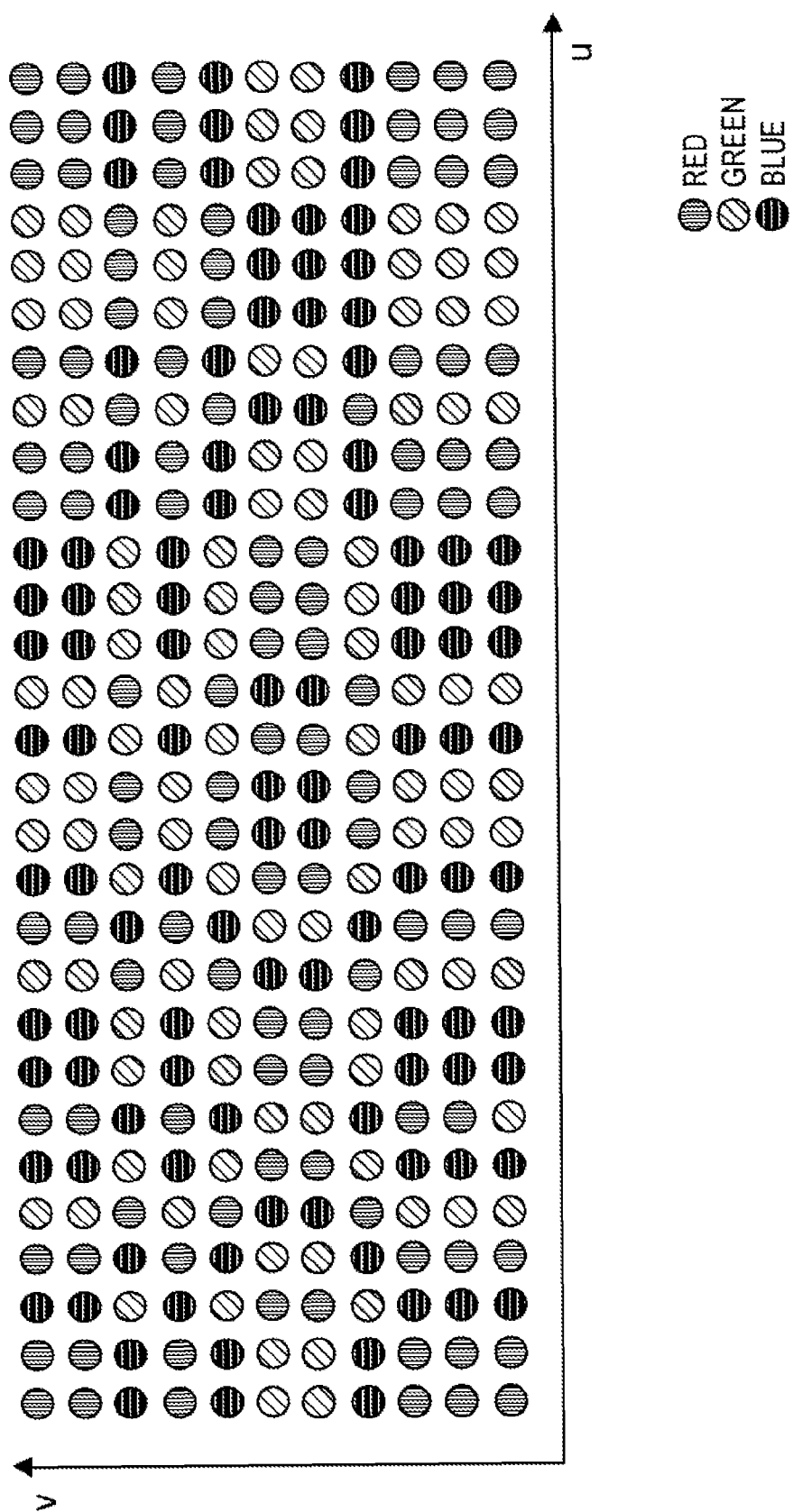
FIG. 2 is a diagram showing an example of a projection pattern image.
Figure 3:
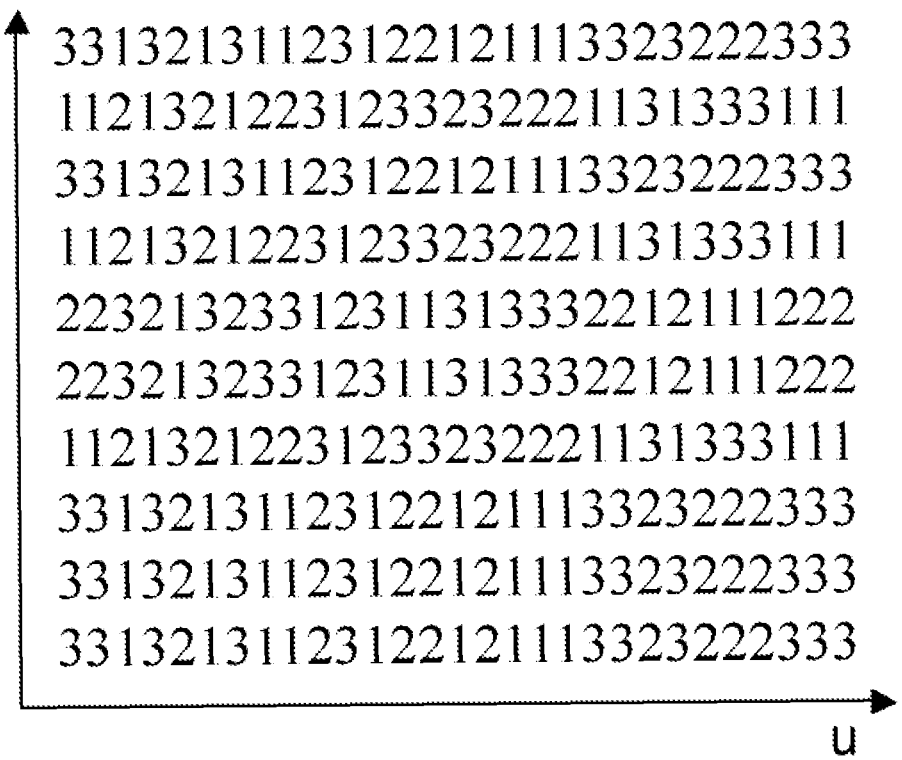
FIG. 3 is a diagram showing an example of a projection code string that is used to generate the projection pattern image.

FIG. 1 shows an overall configuration of an image information processing apparatus according to an embodiment of the present invention. A projector 101 serves as a pattern projection unit that projects a projection pattern image, such as shown in FIG. 2, composed of a sequence of dots that are colored red, green, or blue onto an object 102 to be measured. A pattern generation unit 103 generates a projection pattern image (an image of a projection pattern containing a two-dimensional symbol sequence) containing a two-dimensional dot sequence obtained by assigning, to each code in a projection code string in which a plurality of types of codes are two-dimensionally arranged, a dot whose color or luminance differs for each type of code. In this manner, the projector 101 and the pattern generation unit 103 serve as a pattern projection apparatus. In the present embodiment, the pattern generation unit 103 generates, as a projection pattern image to be projected by the above-described projector 101, an image in which a projection code string composed of codes 1, 2, and 3 shown in FIG. 3 is symbolized by a red, green, and blue dot sequence. It should be noted that although a dot sequence in which red, green, or blue corresponds to each code value is used as the symbolized image, the present invention is not limited to this. A camera 104 serves as an image capturing unit that captures an image of the object 102 in a state in which the projection pattern image is projected onto the object.

Here, the position and orientation of the camera 104 are adjusted so that an x-axis of an image coordinate system on the camera 104 and a straight line defined by positions of two principal points of the projector 101 and the camera 104 are parallel to each other. A pattern extraction unit 105 performs processing for extracting an imaging dot sequence of a portion exposed to the projection pattern image on the object 102 from a captured image obtained by the camera 104.

An information obtaining unit 106 converts each dot in the imaging dot sequence extracted by the pattern extraction unit 105 into a code corresponding to each color to obtain an imaging code string. A code sampling unit 107 selects one of a predetermined plurality of types of sampling features (described later with reference to FIGS. 9 and 10), samples a predetermined number of codes from the imaging code string obtained by the information obtaining unit, and obtains an information code string and a redundant code. A code error detection/correction unit 108 collectively performs code verification of the information code string and the redundant code obtained by the code sampling unit 107, performs detection of a code error in the information code string and the redundant code and, if possible, correction of the code error, and outputs a verified information code string. A correspondence calculation unit 109 determines the correspondence between the projection pattern image and the imaging code string based on the verified information code string obtained by the code error detection/correction unit 108, the projection code string used by the pattern generation unit 103, and the sampling feature used in sampling by the code sampling unit 107. A three-dimensional shape obtaining unit 110 calculates the depth between the camera 104 and the object 102 onto which the projection pattern image was projected, that is, the shape, based on the principle of triangulation using the correspondence-determined imaging dot sequence.

Figure 4:
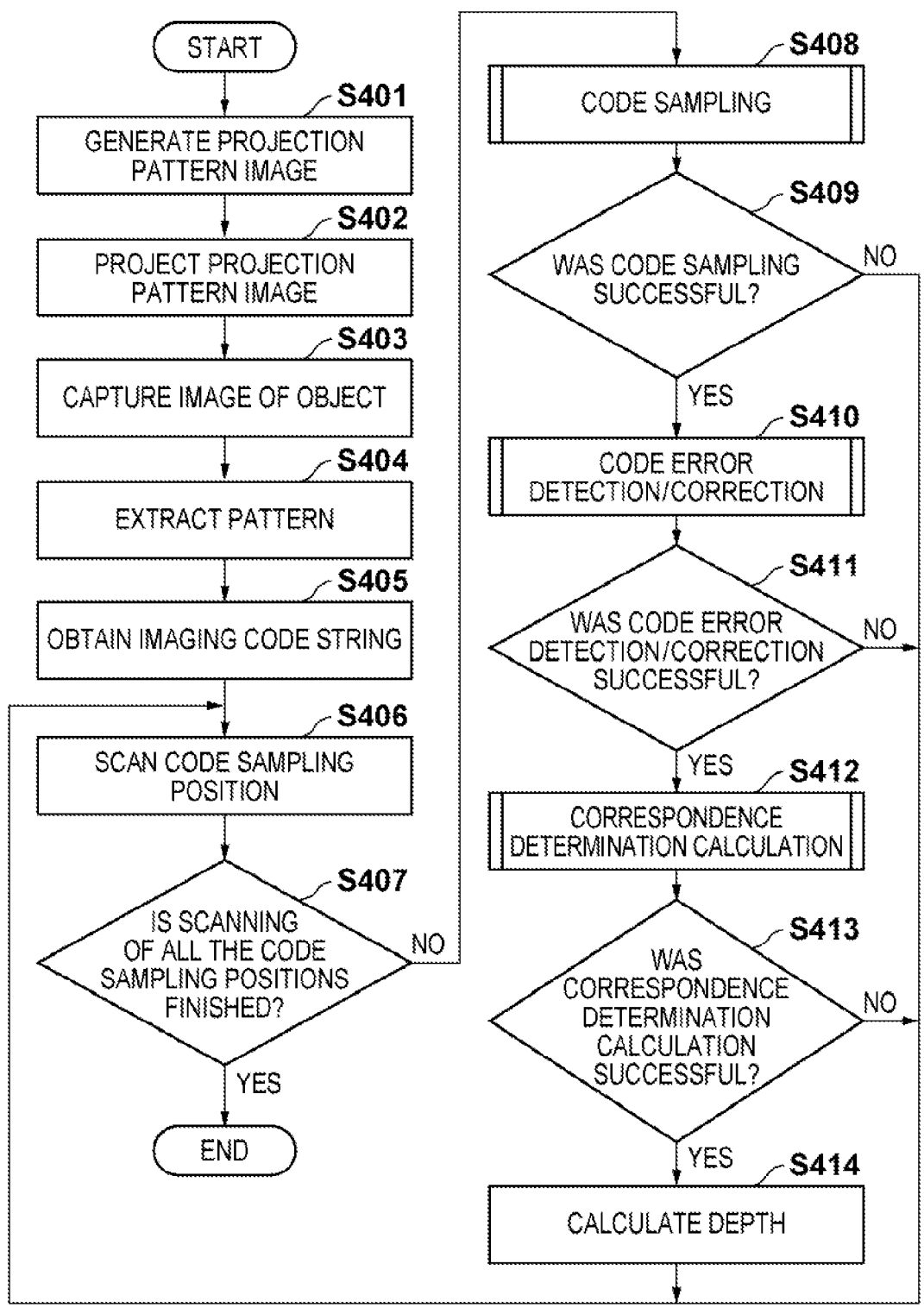
FIG. 4 is a flowchart showing the flow of processing by the three-dimensional measurement apparatus.

FIG. 4 shows a flowchart illustrating control of the image information processing apparatus according to the present embodiment. Hereinafter, the operation of the image information processing apparatus according to the present embodiment will be described in the order of the steps in the flowchart.

Step S401: The pattern generation unit 103 generates a projection pattern image. As shown in FIG. 2, the projection pattern image generated here is composed of a sequence of dots that are colored any of the three colors red, green, and blue depending on the codes and are regularly arranged in vertical and horizontal directions. This red, green, and blue dot sequence serves as a symbol sequence that represents a projection code string, and the sequence in which the dots are arranged is determined using the projection code string shown in FIG. 3. According to the present embodiment, in the projection pattern image, red, green, and blue are respectively assigned to 1, 2, and 3 in the projection code string.

The projection code string shown in FIG. 3 is composed of a two-dimensional array of codes in rows and columns that extend respectively in a u direction and a v direction, and is encoded using a rule described below. First, one de Bruijn sequence for each of the u direction and the v direction, that is, two de Bruijn sequences for a total of two directions, the horizontal direction and the vertical direction, are selected. A de Bruijn sequence is a sequence of a sequence length $k^l$ where the number of types of available unit code is k, and has the property that every contiguous subsequence having a subsequence length l occurs exactly once in the entire code string. For example, the number of symbols that can be used in the projection pattern image is set to k, the size of a rectangle that encloses a sampling feature (described later) is set to m×(n+1) in the order of the u direction and the v direction (a size having m symbols in the horizontal direction and n+1 symbols in the vertical direction). In this case, a de Bruijn sequence of a sequence length $k^m$ is selected in the u direction, and a de Bruijn sequence of a sequence length $k^n$ is selected in the v direction. In the present embodiment, the three colors are used as the symbols, and therefore k=3. Moreover, all the sampling features (described later) are enclosed by rectangles having a size of 3×3, and therefore m=3 and n=2.

The de Bruijn sequence where k=3 and m=3 (the sequence length $3^3$=27) used in the u direction of the present embodiment is a number sequence shown below:

$$3313213112312212111332322233\qquad(1)$$

Similarly, the de Bruijn sequence where k=3 and n=2 (the sequence length $3^2$=9) used in the v direction of the present embodiment is shown below:

$$3311322123\qquad(2)$$

It should be noted that the de Bruijn sequences (1) and (2) that are used in the present embodiment do not allow for cyclicity, and therefore have lengths longer than the original sequence lengths by m+k−1 and n+k−1, respectively. (The case where there is a repetition in the pattern will be described later.)

Next, a method for generating a projection code string using the above-described two de Bruijn sequences will be described. First, in the first row in the u direction, the de Bruijn sequence in the u direction is used as the projection code string as is. In and after the second row in the u direction, a result of adding the values of the de Bruijn sequence in the v direction to the values of the code string in a row directly before the row of interest is used as the code string. Here, the result of addition is expressed in k-ary whereby the result is represented by 1 to k, and carries are ignored. For example, the first numerical value "3" in the sequence shown by (2) is added to each value in the code string in the first row (the code string in the bottom row) in FIG. 3. In this case, the calculations 1+3=1, 2+3=2, and 3+3=3 are performed, so that the code string in the first row and the code string in the second row become equal to each other. Moreover, with regard to the code string in the fourth row, the third value "1" in the sequence of (2) is added to the code string in the third row. Thus, 1+1=2, 2+1=3, and 3+1=1, and therefore, a code string as in the fourth row is obtained by adding 1 to each value in the code string in the third row in FIG. 3. As described above, it is possible to generate a two-dimensional projection code string in the u direction and the v direction, such as shown in FIG. 3, by obtaining code strings by adding all the rows of the de Bruijn sequence in the v direction one by one.

The projection code string generated by using the above-described method has the property that in a partial code string enclosed by a rectangle located at an arbitrary position within the projection code string and having a size m×(n+1), an information code string of a length m+n obtained by sampling a predetermined row and a predetermined column in fixed order occurs exactly once in the projection code string. This property is used for determination of a sampling feature in step S408 and code error detection/correction in step S410, which will be described later.

Processing of the following steps is made possible by generating a projection pattern image in which the projection code string having the above-described property is symbolized and embedded using a dot image in three colors as described above.

Step S402: The projector 101 projects the projection pattern image generated in step S401 onto the object 102.

Figure 5A:
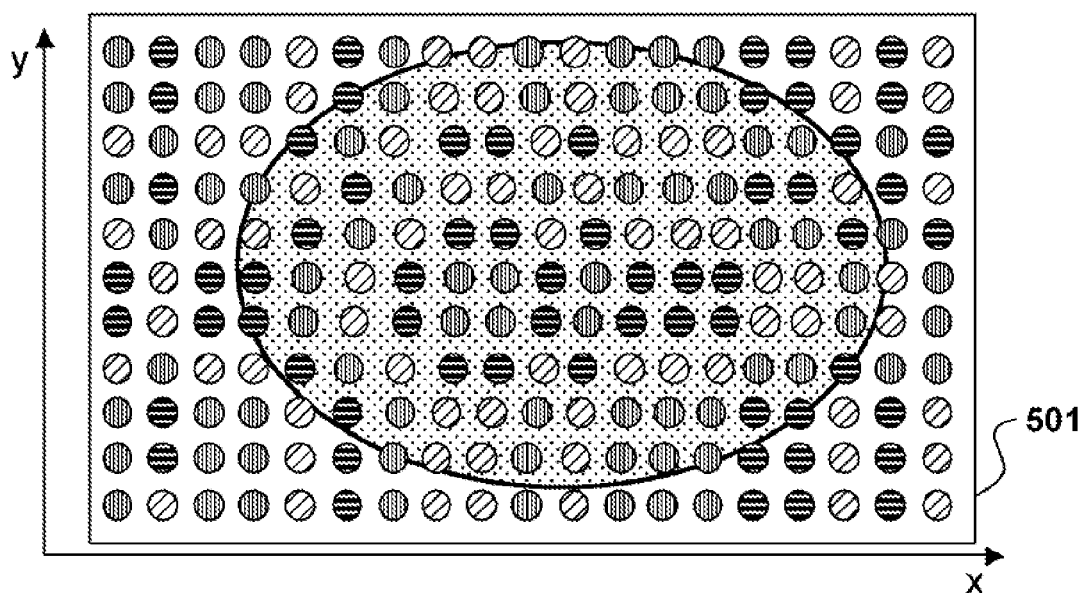
FIGS. 5A and 5B are diagrams showing an example of a captured image and an example of an imaging dot sequence extracted from the captured image.

Step S403: The camera 104 captures an image of the object 102 onto which the projection pattern image is projected and generates a captured image 501 shown in FIG. 5A.

Figure 5B:
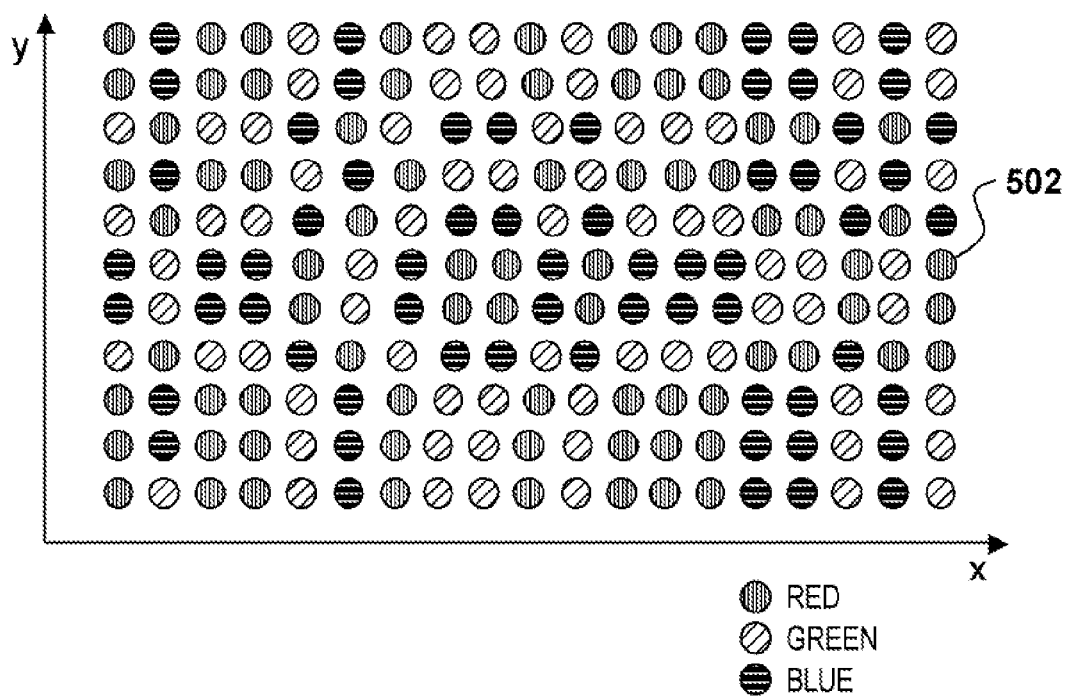

Step S404: The pattern extraction unit 105 extracts an imaging dot sequence 502, which is an imaging pattern corresponding to the projection pattern image projected onto the object 102 as shown in FIG. 5B, from within the captured image 501 generated in step S403. In this processing, regions having a luminance higher than or equal to a predetermined level with respect to each of the colors red, green, and blue are extracted as symbols, whereby the imaging dot sequence 502 is extracted. It should be noted that all the extracted color information is held. Moreover, a single continuous region having a single color is treated as a unitary imaging dot, and a two-dimensional position of each imaging dot (for example, the centroid of the imaging dot) on the x-y camera coordinate system is held.

Step S405: The information obtaining unit 106 obtains an imaging code string based on the imaging dot sequence 502 extracted in step S404. Here, the codes to which dots of each color were assigned as the symbols in step S401 can conversely be decoded. That is to say, the imaging code string is obtained by assigning 1 to red, 2 to green, and 3 to blue. As a unit imaging code (an imaging code for each imaging dot) constituting the imaging code string, the decoded code and the two-dimensional position of the corresponding imaging dot on the x-y coordinates are held. FIG. 6 shows a decoded imaging code string 601.

Next, adjacency relationships between each imaging code and adjacent imaging codes that are present above, below, and to the left and right of that imaging code are decoded. FIG. 7 shows an enlarged diagram of a part of the imaging code string. As an example, decoding of the adjacency relationships of an imaging code 701 of interest in FIG. 7 will be described. Since the position and orientation of the camera 104 are adjusted so that the x-axis of the image coordinate system on the camera 104 and a straight line defined by the positions of the two principal points of the projector 101 and the camera 104 are parallel to each other, all the imaging dot sequences are imaged in a direction parallel to the x-axis. Therefore, adjacency relationships between the imaging code strings in the x direction can be decoded easily. First, the nearest neighboring codes that are present to the left and right of the imaging code 701 of interest in the x direction are searched for as adjacent codes. Next, the adjacency relationships with respect to imaging codes above and below in the y direction are searched for. At this time, since the y direction is not parallel to the y-axis, and there is a possibility that an adjacent code may be present in a state in which it is offset in the x direction, a search range 702 is defined in the x direction, and adjacent codes are searched for in this range.

The adjacency relationships between each imaging code and imaging codes above, below, and to the left and right of that imaging code are restored according to the above-described procedure, and the results of restoration are held in units of imaging code.

Step S406: The code sampling unit 107 scans the imaging code string obtained by the information obtaining unit 106, and in order to obtain the information code string (described later), the origin, which serves as the first dot from which code sampling is started, is set.

Step S407: It is judged whether or not the result of step S406 is that scanning is finished. If scanning is finished, the present processing is ended. If not, the processing proceeds to step S408. Scanning is performed in such a manner that the same origin is not set repeatedly, and it is assumed that scanning is finished once scanning is performed until all the imaging code strings are set as the origins.

Figure 8:
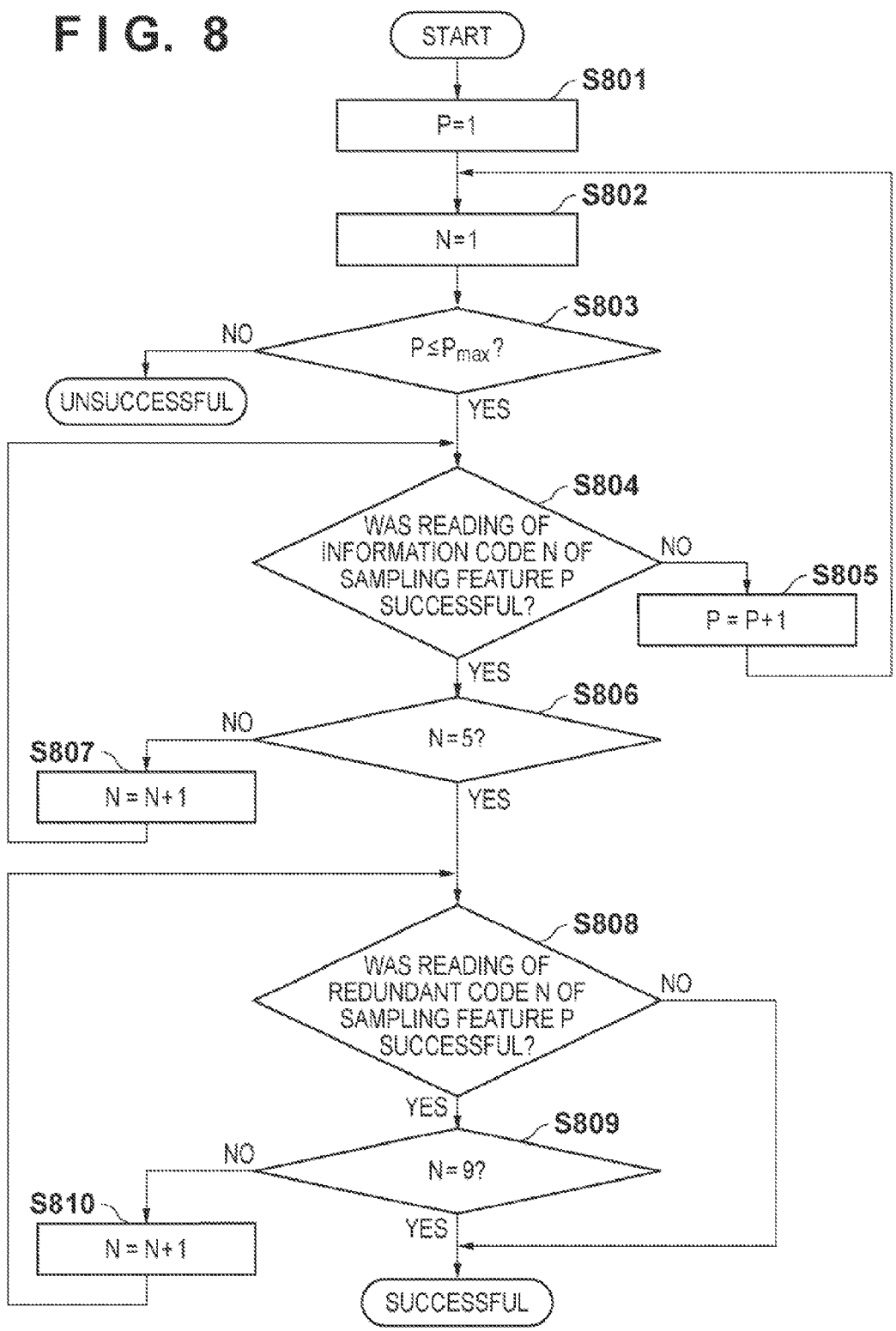
FIG. 8 is a flowchart illustrating a method for obtaining an information code string and a redundant code (step S408).

Step S408: The code sampling unit 107 selects one of a predetermined plurality of types of sampling features. Then, the code sampling unit 107 performs code sampling according to the selected sampling feature from a position corresponding to the origin, which was set in step S406, of the imaging code string obtained by the information obtaining unit 106. Then, the information code string and the redundant code are obtained. FIG. 8 shows a flowchart illustrating a method for obtaining the information code string and the redundant code in step S408. Hereinafter, the operation in step S408 will be described in detail in the order of the steps in the flowchart in FIG. 8.

Step S801: The code sampling unit 107 initializes a sampling feature number P, which indicates the sampling feature used in code sampling, to 1. The sampling feature defines the positions of a predetermined number of dots to be extracted and the sequence of these dots in the information code string. Each of the sampling features selects a predetermined number of dots from a partial dot sequence of a predetermined size. For example, as for the sampling features of the present embodiment, within a rectangle containing a 3×3 partial dot sequence in the imaging code string, all the combinatorial shapes in the case where an arbitrary row and an arbitrary column are sampled in fixed order are prepared, and numbers P are assigned to the prepared shapes in advance. Reference numerals 901 to 909 in FIG. 9 indicate all the sampling features of the present embodiment. Circle marks indicate individual codes, and broken lines indicate rectangles containing a 3×3 partial dot sequence in the imaging code string. Numbers in the codes indicate the sampling sequence (the sequence in the information code string), and sampling is performed in numerical order with the sampling sequence number 1 assigned to the code of interest.

Moreover, a code corresponding to a dot other than the predetermined number of dots in the above-described partial dot sequence (a dot other than the above-described m+n codes) is used as a redundant code to detect an error in the information code string. For example, in the present embodiment, the sampling sequence numbers 1 to 5 indicate an information code string that is used for correspondence determination and has the length m+n=5, and the other sequence numbers, that is, the sequence numbers 6 to 9 other than the information code string indicate redundant codes that are used for code error detection/correction. The information code strings are sampled from different combinations of codes of the imaging code string for each sampling feature, as indicated by 1001 to 1009 in FIG. 10. For example, as a plurality of sampling features, assuming a partial code string having m dots in the horizontal direction and n+1 dots in the vertical direction (in the case of FIG. 10, m=3 and n=2), the positions of m+n codes contained in a single row selected from the horizontal direction and a single column selected from the vertical direction and the sequence of the codes are defined.

Step S802: The code sampling unit 107 initializes the sampling sequence number N that indicates the sequence number of the code string to be sampled to 1.

Figure 9:
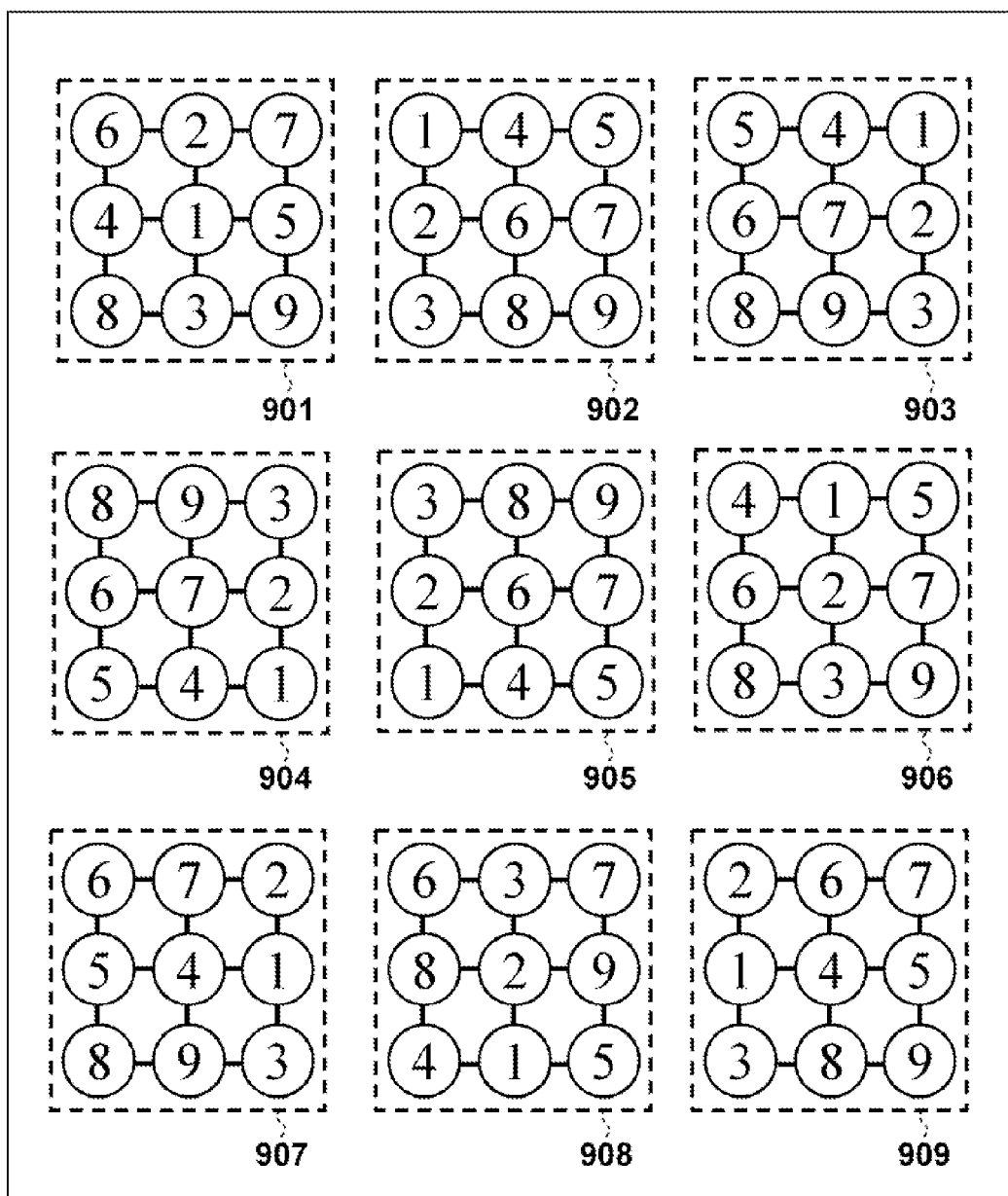
FIG. 9 is a diagram showing all sampling features of an embodiment of the present invention.
Figure 10:
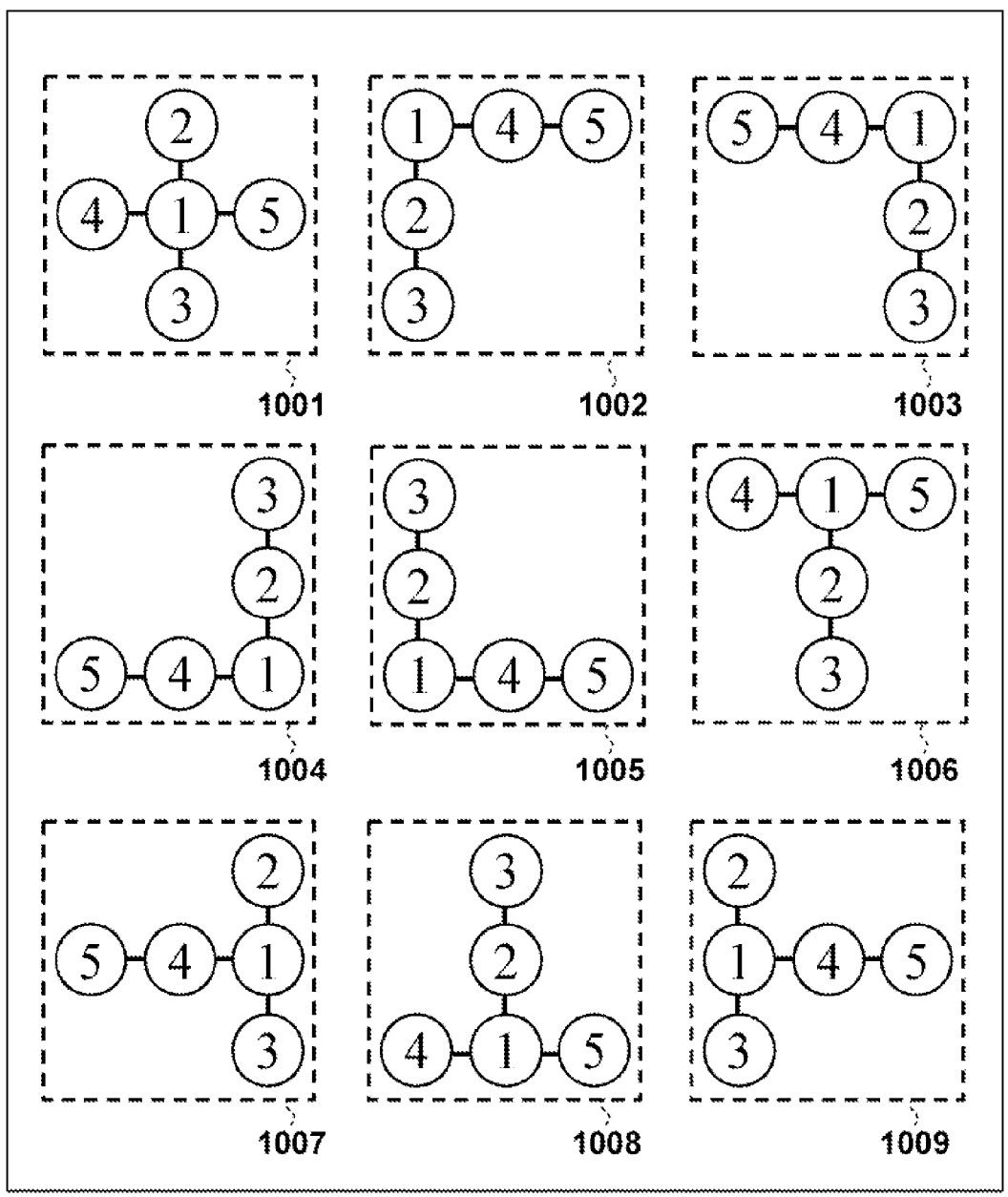
FIG. 10 is a diagram showing information code strings in all the sampling features of the present embodiment.

Step S803: The code sampling unit 107 checks whether or not the sampling feature number P exceeds a maximum number $P_{max}$. In the present embodiment, $P_{max}$=9 as shown in FIG. 9. If it is judged in step S803 that P exceeds $P_{max}$, since this means that it was not possible to obtain information code strings of all the sampling features, the processing in step S406 is regarded as unsuccessful, and is ended. If P does not exceed $P_{max}$, the processing is continued.

Step S804: The code sampling unit 107 samples a code corresponding to the sampling sequence number N of the current sampling feature number P, and obtains one information code string. If this unit succeeded in obtaining the information code string, the processing proceeds to step S806. If there is no adjacent code in the imaging code string, and this unit failed to obtain the information code string at the position of the sampling sequence number N, the processing proceeds to step S805.

Step S805: 1 is added to the sampling feature number P, and the processing returns to step S803.

Step S806: The code sampling unit 107 checks whether the sampling sequence number N has reached the length 5 of the information code string. If this length is not reached, the processing proceeds to step S807. If this length is reached, the processing proceeds to step S808.

Step S807: 1 is added to the sampling sequence number N, and the processing returns to step S804.

Step S808: The code sampling unit 107 samples a code corresponding to the sampling sequence number N of the current sampling feature number P, and obtains one redundant code. If this unit succeeded in obtaining the redundant code, the processing proceeds to step S809. If there is no obtainable code at the position of the sampling sequence number N in the imaging code string, and this unit failed to obtain the redundant code, code sampling is regarded as successful, and the processing is ended.

Step S809: The code sampling unit 107 checks whether or not the sampling sequence number N has reached a maximum length 9 that combines the information code string and the redundant codes. If the maximum length is not reached, the processing proceeds to step S810. If the maximum length is reached, the processing is regarded as successful, and is ended.

Step S810: 1 is added to the sampling sequence number N, and the processing returns to step S808.

By performing the processing according to the above-described procedure, in step S408, sampling from the imaging code string obtained by the information obtaining unit 106 is performed, and the information code strings and the redundant codes (hereinafter, these will be collectively referred to as "sampled code string") are obtained. When the processing of code sampling in step S408 has been completed, the processing proceeds to step S409.

Step S409: The code error detection/correction unit 108 judges whether or not code sampling processing in step S408 was successful. If the processing result was unsuccessful, the processing returns to step S406. If the processing result was successful, the processing proceeds to step S410.

Step S410: The code error detection/correction unit 108 performs code verification using the sampled code string and detects any code error in the sampled code string. Furthermore, if the code error is correctable, the code error detection/correction unit corrects the code. FIG. 11 shows a flowchart illustrating a method of code error detection/correction in step S410. Hereinafter, the operation in step S410 will be described in the order of the steps in the flowchart in FIG. 11.

Step S1101: The code error detection/correction unit 108 calculates a hash value indicating the result of code verification from the sampled code string. FIGS. 12A to 12C show examples of the sampled code string. All the examples in FIGS. 12A to 12C have the same information code string 1201 and differ only in the number of redundant codes. Adjacency relationships between the information code string and the redundant codes in the vertical direction and the horizontal direction all conform to the adjacency relationships of the imaging code string, and the u-coordinate axis of the projection code string is regarded as a row direction, and the v-coordinate axis is regarded as a column direction.

Figures 13A, 13B, 13C:
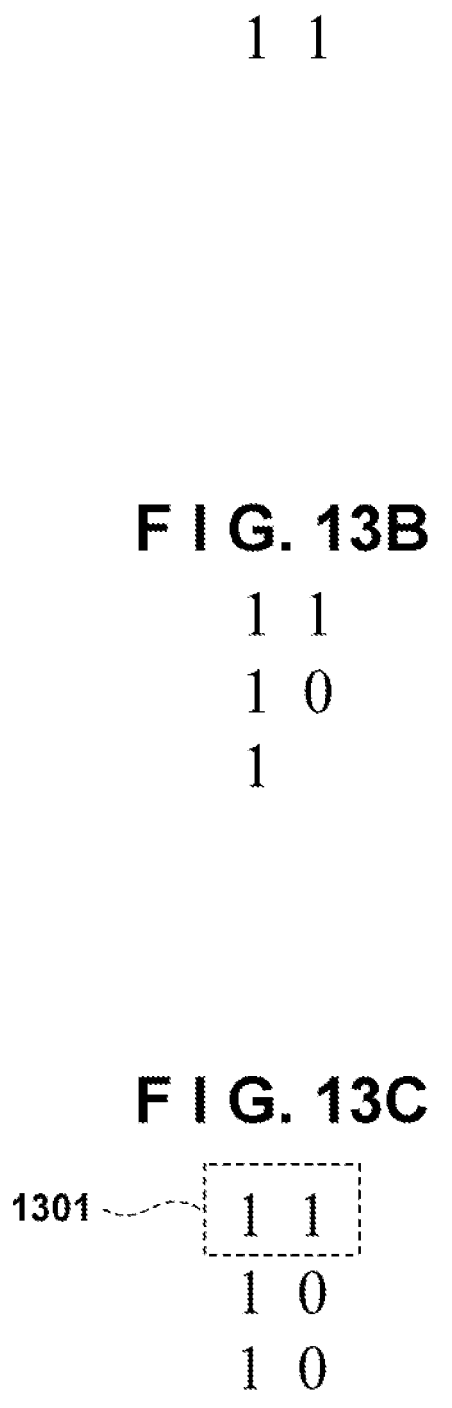

To calculate a hash value, differences between the right column and the left column are sequentially calculated in the row direction of these information code strings and redundant codes. In the present embodiment, the number of columns is n+1=3, and therefore two difference values in each row are calculated as hash values. It should be noted that all the results of difference calculations are represented in k-ary. In the present embodiment, k=3, and therefore the hash values are any one of 0, 1, and 2. Moreover, the hash value calculation is not performed at a position in which there is no sampled code string, and a blank is set in this position. FIGS. 13A to 13C show the hash values of the information code strings and the redundant codes in FIGS. 12A to 12C. In code error detection/correction processing, a single row of hash values in which a set of calculated values in all the columns is complete is treated as a single result of code verification.

Step S1102: The code error detection/correction unit 108 judges whether there is more than a single row of hash values that could be calculated in step S1101. If there is only a single row of hash values, it is only the row generated from the information code string that has the hash values, and code error detection is impossible, so that the processing in step S410 is regarded as successful, and is ended. If there is more than a single row of hash values, the processing proceeds to step S1103. In the example shown in FIG. 13A, there is only a single row of hash values, and therefore this step is regarded as successful and is ended. In the examples shown in FIGS. 13B and 13C, there are two rows and three rows, respectively, of hash values, that is, there is more than a single row in both examples, and therefore the processing proceeds to step S1103.

Step S1103: The code error detection/correction unit 108 judges whether all the hash values in the column direction are the same. If the values in the column direction are all the same, there is no contradiction to the results of addition of the same values in each column during generation of the projection code string, and this means that no code error was detected in the range of the calculated hash values. Thus, the calculation is regarded as successful, and the processing is ended. On the other hand, if there is even one different value in the column direction, a contradiction to the above-described calculation results arises. Therefore, it is judged that there is a code error, and the processing proceeds to step S1104. In both of the examples shown in FIGS. 13B and 13C, the values in the column direction on the right are different. Therefore, in both cases, it is judged that there is a code error, and the processing proceeds to step S1104.

Step S1104: The code error detection/correction unit 108 judges whether there are all the three rows of hash values calculated in step S1101. If the number of rows is less than three, it is not possible to perform code error correction, and thus step S410 is regarded as unsuccessful, and is ended. If there are all the three rows, the processing proceeds to step S1105. In the example shown in FIG. 13B, a set of hash values in the bottom row is not complete, and thus this step S410 is regarded as unsuccessful, and is ended. In the example shown in FIG. 13C, all the sets of hash values in the three rows are complete, and thus the processing proceeds to step S1105.

Step S1105: The code error detection/correction unit 108 judges whether code error correction can be performed with respect to the target sampled code string. First, among the three rows of hash values, a row containing a hash value that is not the same as the other hash values in the column direction is detected. If all the rows contain different hash values, code error correction cannot be performed, and thus step S410 is regarded as unsuccessful, and is ended. If only the hash value in one row is different among the hash values in the three rows, it is judged that there is a correctable code error in that row, and the processing proceeds to step S1106. In the example shown in FIG. 13C, only the value in the right column in a top row 1301 is different, and thus it is judged that there is a correctable code error in this row, and the processing proceeds to step S1106.

Step S1106: The code error detection/correction unit 108 performs code error correction with respect to the row of the sampled code string that was determined to contain a correctable code error in step S1105, using a hash value in another row. The code error detection/correction unit 108 examines, in the row that was first determined to contain a code error, the column in which the hash value is different from those in the other rows.

If only the hash value in the left column is different, it is assumed that there is an error in the code value on the left side of the relevant row of the sampled code string, and this code value is corrected. Error correction can be performed by replacing the error value with the value of the difference between the code value in the center column in the relevant row of the sampled code string and the hash value in the left column in a row other than the relevant row. This difference calculation is also performed using the k-ary in which there is no borrow, that is, using the ternary numeral system in which the answers are only 1, 2, and 3 in the present embodiment.

If only the hash value in the right column is different, it is assumed that there is an error in the code value on the right side of the relevant row of the sampled code string, and correction is performed in the same manner. Error correction can be performed by replacing the error value with the value of the sum of the code value in the center column in the relevant row of the sampled code string and the hash value in the right column in a row other than the relevant row in the ternary numeral system.

If the hash values in both the left and right columns are different, it is assumed that there is an error in the code value in the center column in the relevant row of the sampled code string, and correction is performed in the same manner. Error correction can be performed by replacing the error value with the value of the difference between the code value in the right column in the relevant row of the sampled code string and the hash value in the right column in a row other than the relevant row in the ternary numeral system.

In the example shown in FIG. 13C, only the hash value in the right column in the row 1301 is different, and thus correction is performed assuming that there is an error in the code value "3" in the right column in the relevant row of the sampled code string. In error correction calculation, the error value "3" is replaced with a correction value "2", which is the sum of the code value "2" in the center column in the relevant row of the sampled code string in FIG. 12C and the hash value "0" in the right column in a row other than the row 1301. It can be seen that by performing code error correction in this manner, the information code string "12321" before correction shown in FIG. 12C is corrected to "12221" with a correction value 1202, as shown in FIG. 12D.

After the above-described calculations, this step S410 is regarded as successful, and is ended.

By executing the above-described steps S1101 to S1106, a code error in the sampled code string is detected. Furthermore, if the code error is correctable, code correction is performed. It should be noted that the information code strings with respect to which the processing was successful in this step S410 will be referred to as "verified information code strings" below. The processing proceeds to step S411 in FIG. 4.

Step S411: The code error detection/correction unit 108 determines the processing result of code error correction/detection in step S410. If the processing was successful, the processing proceeds to step S412. If the processing was unsuccessful, the processing returns to step S406, and the processing target is shifted to the next code sampling position.

Figure 14:
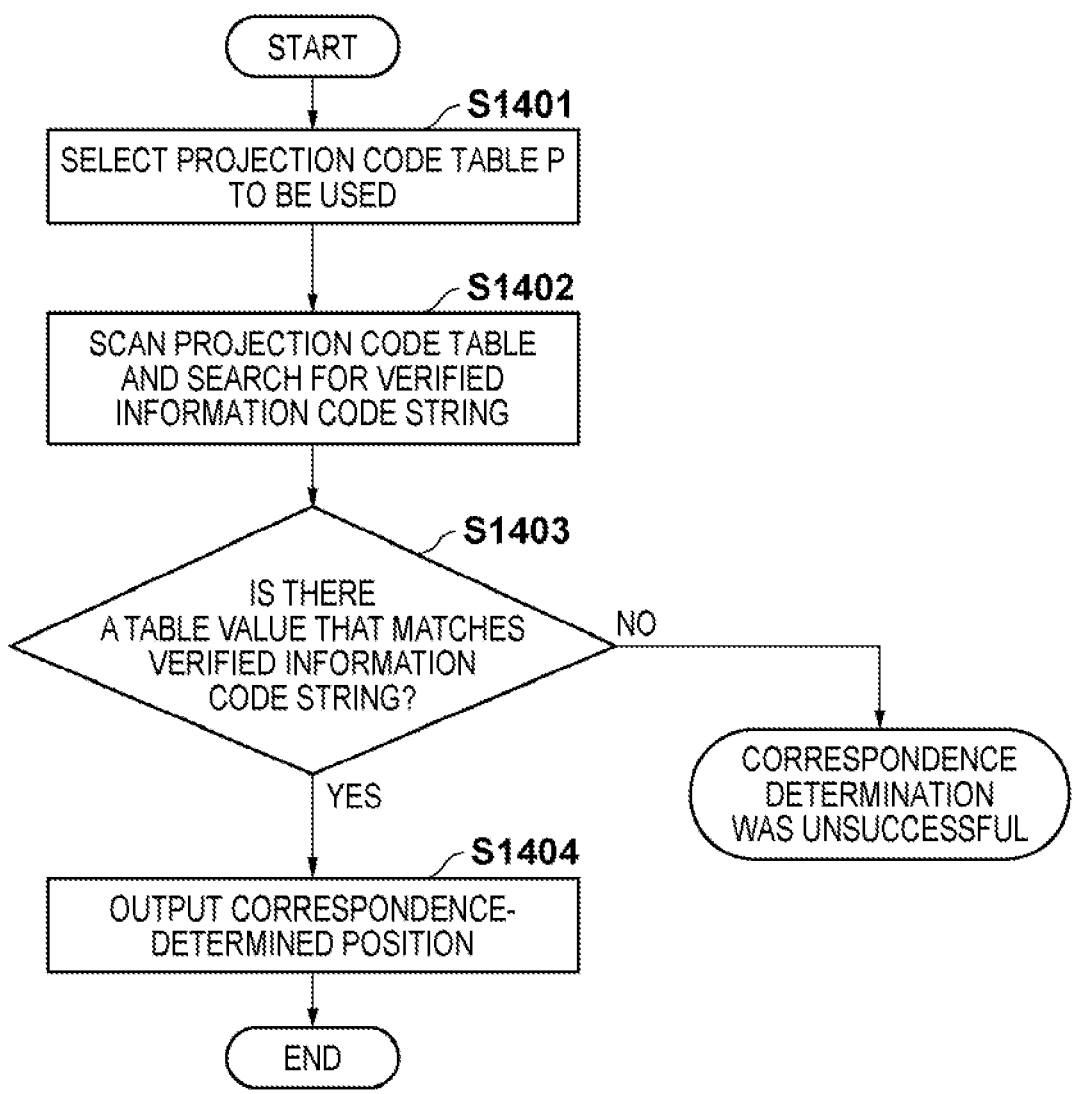
FIG. 14 is a flowchart illustrating a method for determining the correspondence between the projection pattern image and the imaging code string.

Step S412: The correspondence calculation unit 109 determines the correspondence between the projection pattern image and the verified information code strings constituting the imaging code string. FIG. 14 shows a flowchart illustrating a method for determining the correspondence between the projection pattern image and the imaging code string in step S412. Hereinafter, the operation in step S412 will be described in detail in the order of the steps in the flowchart in FIG. 14.

Step S1401: The correspondence calculation unit 109 selects a projection code string table having the same number as the sampling feature number P that was used in sampling of the information code strings in step S408. FIG. 15 shows an example of projection code string tables that are used in the present embodiment. A projection code string table is a table that stores values of information code strings in the case where the projection code string was sampled at various two-dimensional positions (u, v) using the sampling feature number P, and the same number of tables as the number (nine in this example) of sampling features to be used are prepared. By using such a projection code string table, it is possible to easily perform a calculation for determining the correspondence between the projection code string and the verified information code strings without performing a complicated calculation.

Step S1402: The correspondence calculation unit 109 two-dimensionally scans the projection code string table selected in step S1401 in the u direction and the v direction to search for a table value that matches a verified information code string. If there is a matching table value, the (u, v) position of that table value is recorded.

Step S1403: The correspondence calculation unit 109 judges whether there was a table value that matches a verified information code string in the search in step S1402. If there was such a table value, the processing proceeds to step S1404. If there was no such table value, since it is not possible to determine the correspondence, it is judged that the correspondence determination was unsuccessful, and step S412 is ended.

Step S1404: The correspondence calculation unit 109 outputs the verified information code string that contains the (u, v) position of the table value that matched the verified information code string in the search in step S1402 as a correspondence-determined imaging code string and judges that the correspondence determination was successful, and step S412 is ended.

By performing the processing according to the above-described procedure, the correspondence calculation unit 109 determines the correspondence between the projection pattern image and the verified information code strings constituting the imaging code string. Then, the processing proceeds to step S413.

Step S413: The correspondence calculation unit 109 judges the processing result of the calculation for determination of the correspondence in step S412. If the processing was successful, the processing proceeds to step S414. If the processing was unsuccessful, the processing returns to step S406.

Figure 16:
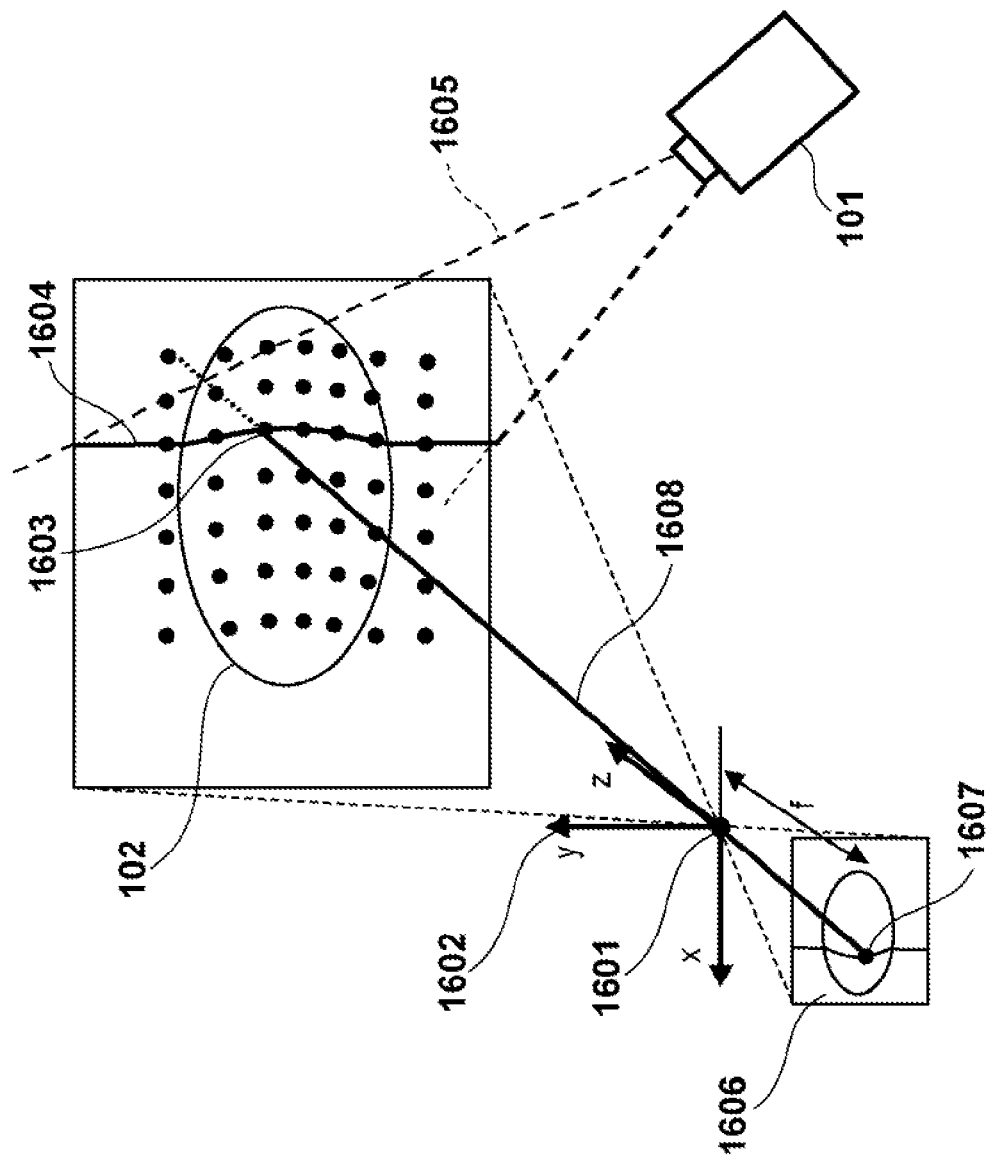
FIG. 16 is a diagram illustrating three-dimensional measurement according to the embodiment.

Step S414: The three-dimensional shape obtaining unit 110 measures the three-dimensional shape of the object 102 using the correspondence-determined imaging code string obtained in step S412. FIG. 16 shows a schematic diagram for the case where the position of a measurement point 1603 corresponding to the correspondence-determined imaging code string in the imaging dot sequence is measured using a camera coordinate system 1602 in which the position of a principal point 1601 of the camera is set to the origin O (0, 0). In the projection pattern image that is projected by the projector 101, dots in a dot sequence having the same u-coordinate value are arranged so as to be aligned in a single straight line 1604 in the v direction. At this time, the measurement point 1603 is a point that lies on a line of intersection of a cutting plane 1605 formed in a space by the straight line 1604 and the object 102. Here, it is assumed that the cutting plane 1605 formed by a projection measurement line pattern is calibrated in advance by formula (3) below using the camera coordinate system:

$$ax+by+cz+d=0 \tag{3}$$

Moreover, the measurement point 1603 lies on a straight line 1608 represented by formula (4) below using the position P (Px, Py, −f) of a projection point 1607 on a captured image 1606 captured by the camera 104 in FIG. 1. It should be noted that in the captured image 1606, an imaging dot sequence excluding the projection point 1607 is omitted for the sake of simplicity. Moreover, the captured image 1606 in FIG. 16 has an actual size that is equal to a projection image on an image sensing device when the camera 104 in FIG. 1 is assumed as a pinhole camera. Furthermore, it is assumed that the captured image 1606 is parallel to the xy plane of the camera coordinates, and the center of the image is disposed in a position away from the position of the origin in a z-axis direction by a focal length −f:

$$x = -\frac{P_x}{f}t$$
$$y = -\frac{P_y}{f}t \tag{4}$$
$$z = t$$

where t is a parameter that is an arbitrary real number.

Since a point of intersection of the cutting plane 1605 represented by formula (3) and the straight line 1608 represented by formula (4) is the measurement point 1603, the position C (Cx, Cy, Cz) of the measurement point 1603 in the camera coordinate system is represented by formula (5) below:

$$C_x = -\frac{dP_x}{aP_x + bP_y - cf}$$
$$C_y = -\frac{dP_y}{aP_x + bP_y - cf} \tag{5}$$
$$C_z = \frac{df}{aP_x + bP_y - cf}$$

If the above-described calculations are applied to all the correspondence-determined imaging code strings, the shape of the entire object 102 can be obtained from a set of measurement points 1603.

By performing the above-described procedure, even with respect to such an object that has a discontinuous surface as a boundary, which has tended to result in an erroneous result of correspondence determination with the conventional method, it is possible to minimize erroneous determination of correspondence by performing code error correction/detection in step S410. Moreover, even with respect to an object having a complicated shape, which has been difficult to determine the correspondence because the conventional method uses only one type of sampling feature, regions in which the correspondence can be determined are increased by attempting to sample information code strings using a plurality of types of sampling features in step S408. Due to the foregoing reasons, it is possible to perform more robust three-dimensional measurement than with the conventional method.

It should be noted that the pattern generation unit 103, the pattern extraction unit 105, the information obtaining unit 106, the code sampling unit 107, the code error detection/correction unit 108, the correspondence calculation unit 109, and the three-dimensional shape obtaining unit 110 in FIG. 1 of the present embodiment are not necessarily independent apparatuses. These units may also be each realized as a part of a program that runs on a computer composed of a central processing unit, a main storage, an external storage, and an information bus that connects these devices to each other.

Moreover, it is not necessarily required that a projection pattern image be generated by the pattern generation unit 103 in step S401 each time processing is performed. A projection pattern image that has been once generated can be stored in a memory and read out from the memory the next time it is needed. In such a case where the object to be imaged is limited, and an optimum projection pattern image is determined in advance, it is possible to omit the processing by using the above-described configuration and achieve a speed-up.

Moreover, in some cases, information code strings can be obtained from most of the regions using a smaller number of sampling features, depending on the shape, size, and surface material of the object 102. In such cases, the number of sampling features to be used in step S408 may be reduced to a minimum of one. As the number of sampling features decreases, the calculation load decreases, and therefore it is possible to achieve a balance between the complexity of an imageable object and the processing speed by appropriately reducing the number of sampling features.

Moreover, similarly, depending on the shape, size, and surface material of the object 102, there are cases where a code error hardly occurs. In such a case, the code error detection/correction unit 108 and corresponding processing, that is, step S410 may be omitted. Omission of the processing results in a decrease in the calculation load, and therefore it is possible to achieve a balance between the complexity of an imageable object and the processing speed by appropriately omitting the processing as described above.

Moreover, in the present embodiment, it is assumed that the number of types of symbols for use in the projection pattern image is set to three, that is, red, blue, and green, and the size of the rectangle that encloses a sampling feature is set to 3×3. Thus, three-digit de Bruijn sequences having subsequence lengths of 2 and 3 are selected as the de Bruijn sequences that are used to generate the projection code string. These numerical values may also be appropriately changed, and three or more digit de Bruijn sequences having subsequence lengths of 3 or more may be used, depending on the type of symbols that can be used in the projection pattern image or the properties of the object. If the number of symbols to be used can be increased, it is possible to improve the code error correction/detection ability depending on the selected de Bruijn sequences. Alternatively, it is also possible to improve the imageable range by increasing the size of the entire projection code string.

Moreover, although the dot sequence in which red, green, or blue corresponds to each code value and serves as the symbol for use in the projection pattern image was used in the present embodiment, the present invention is not limited to this. Any type of symbols can be used, as long as a distinguishable feature such as color, luminance, and shape is set corresponding to each code value so that each code value can be distinguished. FIG. 17 shows an example of another projection pattern. In the projection pattern image of this example, the symbols are expressed as the shapes at the positions of points of intersection in a projection pattern having horizontal and vertical lines forming a grid, instead of the dots. In this example, if the shape at the position of a point of intersection is a rectangle, a corresponding code is set to 1, if the shape is a cross, a corresponding code is set to 2, and if the shape is a circle, a corresponding code is set to 3. With the above-described configuration, it is possible to use a monochrome projection pattern image, and therefore the projector 101 can be simplified. Moreover, it is also possible to more easily detect the adjacency relationships between codes by tracing the horizontal and vertical lines forming a grid.

Moreover, although the configuration in which only one projection code string based on de Bruijn sequences is used is adopted in the present embodiment, a projection pattern image in which a projection code string is repeated may be used in the case where the change in a depth direction of the object is sufficiently small, and information code strings having the same value never overlap with each other. It should be noted that in the case where a projection code string is repeated, it is necessary to take the cyclicity into account with respect to de Bruijn sequences to be used, so that it is necessary to use sequences of original sequence lengths.

The de Bruijn sequence where k=3 and m=3 (the sequence length $3^3$=27) to be used in the u direction in this example is a number sequence below:

$$3313213112312212111133232223 \quad (6)$$

Similarly, the de Bruijn sequence where k=3 and n=2 (the sequence length $3^2$=9) to be used in the v direction in the present embodiment is shown below:

$$331132212 \quad (7)$$

As described above, it is possible to expand the imageable range by using a projection pattern image in which a projection code string is repeated.

Moreover, in step S1102 in step S410 of the present embodiment, in the case where there is only one row of hash values, code error detection is impossible, and therefore, it is judged that there is no code error, and the processing is ended. However, this may be judged as unsuccessful if it is desired to reduce erroneous correspondences even more. Furthermore, since the longer the redundant code, the more the code error correction/detection ability is improved, the length of the redundant code that was able to be obtained may be treated as a measure of reliability and used as a criterion based on which it is judged whether or not to use the result of correspondence determination.

Moreover, it is not necessarily required to use de Bruijn sequences as the projection code string as in the present embodiment. In the case where only two types of symbols can be used, for example, in the case where a projection pattern image is projected using a monochrome projector, an M-sequence formed of two-digit codes that are expressed using 0 and 1 may be used as the projection code string. In the case where the M-sequence is used, the projection code string can be generated in the same manner as in the above-described example by setting the size of the rectangle that encloses a sampling feature to m×(n+1), selecting two types of, that is, m-th order and n-th order M-sequences in the u direction and the v direction, respectively, and calculating a binary sum. In the case where the M-sequence is used, even though the sampling feature size becomes relatively large, it is only two types of symbols that are required, and a high-density projection pattern image can be projected. Therefore, in an environment in which there are few code errors, it would be possible to perform more precise three-dimensional measurement.

As described above, according to the present embodiment, since code strings with respect to which code error correction is possible can be obtained while minimizing the number of imaging patterns picked out from the captured image, it is possible to not only reduce erroneous determination of correspondence, but also deal with a wider variety of object shapes.

According to the present invention, a more robust three-dimensional measurement method that reduces erroneous determination of correspondence and also enables three-dimensional measurement with respect to a wider variety of shapes of objects is provided.

Although a detailed description of the embodiment was given above, the present invention can be embodied as, for example, a system, an apparatus, a method, a program, or a storage medium. Specifically, the present invention may be applied to a system consisting of a plurality of devices, or may be applied to an apparatus consisting of a single device.

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-201341, filed Sep. 8, 2010, which is hereby incorporated by reference herein in its entirety.

The invention claimed is:

1. An image information processing apparatus that performs three-dimensional measurement of an object using a captured image obtained by projecting onto the object a projection pattern obtained by assigning, to each code in a projection code string in which a plurality of types of codes are two-dimensionally arranged, a symbol that differs from one type of code to another, the apparatus comprising:
    an obtaining unit configured to obtain an imaging pattern by extracting symbols from the captured image;
    a converting unit configured to convert each symbol in the imaging pattern obtained by the obtaining unit into a corresponding code to obtain an imaging code string;
    a generating unit configured to generate an information code string by obtaining a predetermined number of codes from the imaging code string according to a sampling pattern in which sampling positions of the predetermined number of codes and a sequence of the codes are defined and arranging the obtained codes; and
    a measuring unit configured to perform three-dimensional measurement of the object by determining correspondence between the information code string and the projection code string based on the information code string and the sampling pattern,
    wherein if it is not possible to obtain the predetermined number of codes from the imaging code string using the sampling pattern, the generating unit selects another sampling pattern to generate the information code string.

2. The apparatus according to claim 1, wherein the sampling pattern and the projection code string are configured so that all information code strings obtained from a single sampling pattern occur exactly once in the projection pattern.

3. The apparatus according to claim 2, wherein the projection code string is generated based on one de Bruijn sequence composed of codes of three or more digits in each of the horizontal and vertical directions.

4. The apparatus according to claim 3, wherein horizontal and vertical sizes of the partial code string are equal to subsequence lengths of the horizontal and vertical de Bruijn sequences used for the projection code string.

5. The apparatus according to claim 2, wherein the projection code string is generated based on one M-sequence composed of codes of two digits in each of the horizontal and vertical directions.

6. The apparatus according to claim 5, wherein horizontal and vertical sizes of the partial code string are equal to subsequence lengths of the horizontal and vertical M-sequences used for the projection code string.

7. The apparatus according to claim 1, wherein the sampling pattern is used to generate an information code string from a partial code string of a predetermined size, the apparatus further comprising:
    a detecting unit configured to detect an error in the information code string using a redundant code other than the information code string in the partial code string.

8. The apparatus according to claim 1, wherein the sampling pattern defines positions of a column in a vertical direction and a row in a horizontal direction for extracting m+n codes from a partial code string having m dots in the horizontal direction and n+1 dots in the vertical direction, and a sequence of the extracted codes.

9. The apparatus according to claim 8, further comprising a detecting unit configured to correct/detect an error in the information code string using a code other than the m+n codes that are used to generate the information code string in the partial code string as a redundant code.

10. A method for controlling an image information processing apparatus that performs three-dimensional measurement of an object using a captured image obtained by projecting onto the object a projection pattern obtained by assigning, to each code in a projection code string in which a plurality of types of codes are two-dimensionally arranged, a predetermined symbol that differs from one type of code to another, the method comprising:
    obtaining an imaging pattern by extracting symbols from the captured image;

converting each symbol in the imaging pattern obtained in the obtaining step into a corresponding code to obtain an imaging code string;

generating an information code string by obtaining a predetermined number of codes from the imaging code string according to a sampling pattern in which sampling positions of the predetermined number of codes and a sequence of the codes are defined and arranging the obtained codes; and performing three-dimensional measurement of the object by determining correspondence between the information code string and the projection code string based on the information code string and the sampling pattern, wherein in the generating step, if it is not possible to obtain the predetermined number of codes from the imaging code string using the sampling pattern, another sampling pattern is selected to generate the information code string.

11. A non-transitory computer-readable storage medium storing a computer program that causes a computer to execute the steps of the method according to claim 10.

12. An image information processing apparatus that performs three-dimensional measurement of an object using a captured image obtained by projecting onto the object a projection pattern obtained by assigning, to each code in a projection code string in which a plurality of types of codes are two-dimensionally arranged, a symbol that differs from one type of code to another, the apparatus comprising:

an obtaining unit configured to obtain an imaging pattern by extracting symbols from the captured image;

a converting unit configured to convert each symbol in the imaging pattern obtained by the obtaining unit into a corresponding code to obtain an imaging code string;

a selecting unit configured to select a sampling pattern from a plurality of sampling patterns, in which sampling positions of the predetermined number of codes and a sequence of the codes are defined;

a generating unit configured to generate an information code string by obtaining a predetermined number of codes from the imaging code string according to the selected sampling pattern; and a measuring unit configured to perform three-dimensional measurement of the object by determining correspondence between the information code string and the projection code string based on the information code string and the selected sampling pattern.

13. A method for controlling an image information processing apparatus that performs three-dimensional measurement of an object using a captured image obtained by projecting onto the object a projection pattern obtained by assigning, to each code in a projection code string in which a plurality of types of codes are two-dimensionally arranged, a symbol that differs from one type of code to another, the method comprising:

obtaining an imaging pattern by extracting symbols from the captured image;

converting each symbol in the imaging pattern obtained in the obtaining step into a corresponding code to obtain an imaging code string;

selecting a sampling pattern from a plurality of sampling patterns, in which sampling positions of the predetermined number of codes and a sequence of the codes are defined;

generating an information code string by obtaining a predetermined number of codes from the imaging code string according to the selected sampling pattern; and performing three-dimensional measurement of the object by determining correspondence between the information code string and the projection code string based on the information code string and the selected sampling pattern.

14. A non-transitory computer-readable storage medium storing a computer program that causes a computer to execute the steps of the method according to claim 13.

* * * * *